United States Patent Office 3,511,718
Patented May 12, 1970

3,511,718
PROCESS OF FORMING AN OXIDE CRUST ON A PILE OF IRON PARTICLES
Marnell A. Segura, Baton Rouge, La., assignor to Esso Research and Engineering Company, a corporation of Delaware
No Drawing. Filed Nov. 29, 1967, Ser. No. 686,743
Int. Cl. C23f 7/04
U.S. Cl. 148—6.14                        8 Claims

ABSTRACT OF THE DISCLOSURE

This invention relates broadly to the art of powdered metallurgy, and particularly to the art of protecting particulate metals, especially powdered ferrous metals, from exposure. In particular, it relates to a process for forming protective oxide films, surfaces, layers, or coatings on piles of particulate ferrous metals by spraying the surfaces thereof with dilute aqueous solutions of iron halide salts or halogen acids.

---

The protection of powdered ferrous metals, as contrasted with the protection of metal aggregates generally, offers special problems dependent upon numerous factors. A major problem is that the powders offer very large surface areas, thus greatly increasing the actual exposure. Certain of the powdered ferrous metals are also very highly "active" and readily chemically react when exposed to various environments. To decrease the exposure area, to lessen the activity, and to improve handling characteristics generally, powdered metals per se are often admixed with various additives and binders and thence compacted. Sometimes, in addition, a surface coating is applied, and in this manner exposure of the inner portion of the mass is, at least to some extent, prevented. Among other disadvantages, however, impurities are often introduced into the metals which are very undesirable, and often intolerable. No mode of protection has been found entirely suitable, and particularly is this so in relation to the formation of certain forms of powdered ferrous metals which are assuming an increasingly important role in today's technology.

In the field of powdered metallury, the techniques of producing, handling, and using finely divided metals or powders has always presented certain handling problems, and occasionally dangers, which have tended to suppress their full commercial utilization. There is, in particular, an increasing demand for a method of producing iron by direct reduction (reduction of ores without melting), and there is a desire to process such powders in conventional furnaces. The handling of the highly active metal powders from direct reduction processes, however, has presented problems which are especially acute, and militate against their widespread use. Iron ores, which are reduced at temperatures below the softening point of iron, generally exhibit a tendency, even after cooling, to be pyrophoric, which is a tendency for the iron to rapidly, or instantaneously, reoxidize on exposure to air, often with violent reaction. On the other hand, reduced iron is subsequently treated to lessen pyrophoricity, or iron formed by reduction at temperatures above the softening point of iron may be less violently reactive but, nonetheless, there are some extremely difficult problems associated even with the handling and use of these products.

At a plant site, it is often essential that a particulate reduced iron product, even after careful cooling, be stored, or shipped, in large quantities. There is, however, a tendency for a reduced iron product to back-oxidize, often relatively rapidly, especially where it must be stored, often for months, or shipped under relatively adverse conditions. In the presence of atmospheric moisture, there is an acute tendency for the reduced iron product to back-oxidize, this to the chagrin of potential users who desire a highly metallic product. Metal loss due to wind and rain is quite acute.

The disadvantages, difficulties, and potential problems associated with handling and shipping such metal products are therefore apparent. hTe art is in dire need of effective ways and means of protecting particulate ferrous metals such as those produced in direct iron ore reduction processes.

Accordingly, it is the primary objective of the present invention to supply this need. In particular, it is an object to obviate the foregoing and other disadvantages by providing a method for forming protective films, crusts, or coatings on ferrous metal surfaces, especially active ferrous metal surfaces of relatively large surface areas. A specific object is to provide a method for the protection of ferrous metals produced by direct reduction processes, especially direct iron ore reduction processes.

These and other objects are achieved by the present invention which contemplates forming piles of particulate ferrous metal, and then rapidly forming oxide surface films, coatings, or crusts thereon by contact of the surface of the pile with dilute aqueous solutions of compounds selected from salts of iron halides and halogen acids to render the so-treated metals resistant to further change upon continued exposure to various environments which tend to produce oxidation. In accordance therewith, a liquid dispersion or solution of an iron halide salt or halogen acid is applied to the surface of a pile to form an impervious oxide crust which acts as a barrier to lessen or prevent further penetration by the atmosphere, moisture and various corrosive gases, fumes or impurities. The crust also acts as a barrier to prevent wind and rain losses.

Suitably, a pile is formed and the surface is then wetted, preferably by spraying with a dilute aqueous solution of the halogen salt or acid to induce crust formation. From about 0.01 to about 0.1, and preferably from about 0.03 to about 0.05 percent, based on the weight of water, of the salt or acid is used in forming the solution. Sufficient of the solution is used to penetrate the surface of a pile to a depth ranging preferably to about ¼ inch, and more preferably to a depth ranging from about ¹⁄₁₆ to about ⅛ inch, this forming a relatively impervious oxide coating or crust generally about equal to the depth of penetration.

In inducing crust formation, a single spraying is generally sufficient, an observable oxide crust being formed within a few hours. Since, after formation of the crust, the interior of a pile is protected from further penetration by the atmosphere, moisture, corrosive gases, fumes and the like, it is apparent that the greater the volume of a pile relative to its surface area, the more beneficial the effect in preventing loss of metallization (metallic metal) values as a result of reoxidation. Insofar as the crust per se is concerned, it is found that metallization ranges about 35 percent.

The preferred halogen salts and acids suitable for the practice of this invention are the chlorides. Exemplary of such chloride salts are ferrous perchlorate, ferrous chloride, ferric chloride, and the like. Hydrochloric acid is exemplary of a preferred acid. Other suitable salts and acids include, e.g., ferrous bromide, ferric bromide, ferrous fluoride, hydrobromic acid and the like.

This invention, its attributes and advantages, will be even better understood by reference to the following illustrative examples, demonstrations, and data.

In the following demonstrations and examples, raw natural hematite ore is charged to the top or initial stage of a reactor containing a series of four fluidized beds and progressively reduced, upon descent from one bed to the next of the series, by treatment with an ascending gaseous mixture of hydrogen and carbon monoxide at temperatures ranging from an initial 1400° F. to 1500° F. in the final fluidized bed. The particulate reduced iron product is withdrawn from the final stage of the reactor and treated as subsequently described.

EXAMPLE

Five ton portions of the reduced iron powder, 90.8 percent metallized, are withdrawn from the reactor and formed into two conical shaped piles. Thermocouples are placed within the piles, both of which are left outdoors for subjection to the elements.

The first of the piles is sprayed with a 0.05 weight percent aqueous solution of hydrochloric acid, the pile being wetted to a depth of ¼ inch below the surface. A visible oxide crust forms on the surface of the pile within several hours.

The second of the two piles is left untreated, the pile crusting over after the first rain. Within two weeks an apparently firm visible oxide crust covers both piles.

The following table gives a history of comparative schedule of the metallization or degree of back-oxidation over a period of several months. The specimens for the analyses are taken from depths six inches below the surface of the piles.

| Days of Exposure | Metal Content, Percent | |
|---|---|---|
| | Treated Pile | Untreated Pile |
| Initial | 90.8 | 90.8 |
| 21 | 89.5 | 88.7 |
| 48 | 88.3 | 87.4 |
| 279 | 87.6 | 79.8 |

Suitable crusts are also obtained when the piles of reduced iron are treated with 0.1 percent aqueous solutions of ferrous chloride and ferric chloride, respectively.

It will be understood that the specific method described, and the products produced, can be modified to some extent without departing the spirit and scope of the present invention.

Having described the invention, what is claimed is:

1. A process for protecting particulate ferrous metals against excessive back-oxidation comprising forming a pile of the particulate metal and thence contacting the exterior surface of the pile with a dilute aqueous solution of a compound selected from the group consisting of the salts of iron halides and halogen acids in amount sufficient to induce oxide crust formation which acts as an impervious barrier to lessen further penetration by the atmosphere, moisture and various corrosive gases, fumes and impurities.

2. The process of claim 1 wherein the oxide crust is formed to a depth ranging to about ¼ inch below the surface.

3. The process of claim 1 wherein the solution is formed from compounds selected from salts of iron chlorides and hydrochloric acid.

4. The process of claim 3 wherein from about 0.01 to about 0.1 percent, based on the weight of the water, is contained in the solution.

5. The process of claim 4 wherein from about 0.03 to about 0.05 percent of the compound is contained in solution.

6. The process of claim 1 wherein the pile is formed from the metallized product of a direct iron ore reduction process.

7. The process of claim 6 wherein the product is one resultant from a fluidized iron ore reduction process.

8. The process of claim 7 wherein the pile is formed from a product at least about 90 percent metallized.

References Cited

UNITED STATES PATENTS

| | | | |
|---|---|---|---|
| 1,082,161 | 12/1913 | Lang | 148—6.14 X |
| 1,274,952 | 8/1918 | Speed | 148—6.14 X |
| 1,383,703 | 7/1921 | Elmen | 148—6.14 |
| 2,204,781 | 6/1940 | Wattles | 117—6 |
| 3,418,174 | 12/1968 | Hommerberg | 148—6.14 |

RALPH S. KENDALL, Primary Examiner

U.S. Cl. X.R.

75—33; 117—6, 100